US009826381B2

(12) United States Patent
Bontu et al.

(10) Patent No.: US 9,826,381 B2
(45) Date of Patent: Nov. 21, 2017

(54) DEVICE HANDSHAKE/DISCOVERY FOR INTER-DEVICE COMMUNICATION IN WIRELESS COMMUNICATION SYSTEMS

(71) Applicants: Chandra Sekhar Bontu, Kanata (CA); Yi Song, Irving, TX (US); Zhijun Cai, Irving, TX (US)

(72) Inventors: Chandra Sekhar Bontu, Kanata (CA); Yi Song, Irving, TX (US); Zhijun Cai, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 463 days.

(21) Appl. No.: 13/622,137

(22) Filed: Sep. 18, 2012

(65) Prior Publication Data

US 2014/0078971 A1    Mar. 20, 2014

(51) Int. Cl.
*H04W 4/00* (2009.01)
*H04W 8/00* (2009.01)
*H04W 72/12* (2009.01)
*H04W 76/02* (2009.01)

(52) U.S. Cl.
CPC ........ *H04W 8/005* (2013.01); *H04W 72/1278* (2013.01); *H04W 76/023* (2013.01)

(58) Field of Classification Search
None
See application file for complete search history.

(56) References Cited

U.S. PATENT DOCUMENTS

| 6,925,286 B1 * | 8/2005 | Kraiem | H04W 52/08 455/13.4 |
|---|---|---|---|
| 7,969,968 B2 | 6/2011 | De Luca et al. | |
| 8,515,500 B2 | 8/2013 | Das et al. | |
| 8,582,593 B2 | 11/2013 | Chen et al. | |

(Continued)

FOREIGN PATENT DOCUMENTS

| CN | 102217411 | 10/2011 |
|---|---|---|
| CN | 102340829 | 2/2012 |

(Continued)

OTHER PUBLICATIONS

International Search Report for Application No. PCT/US2013/026174, dated Jul. 17, 2013, 18 pages.

(Continued)

*Primary Examiner* — Kwang B Yao
*Assistant Examiner* — Hardikkumar Patel
(74) *Attorney, Agent, or Firm* — Fish & Richardson P.C.

(57) ABSTRACT

Systems, methods, and apparatuses for inter-device communication in wireless communication systems are provided. A user equipment (UE) may initiate a direct inter-device communication link between UEs located in proximity. The UEs participating in the inter-device communications may perform a device handshake procedure or a device discovery procedure to set up appropriate transmission parameters for the communication over the inter-device communication link. A device-to-device radio network temporary identification (DD-RNTI) may be used for the inter-device communication link. Long term evolution (LTE) downlink or uplink radio resources may be used for communications over the inter-device communication link.

20 Claims, 4 Drawing Sheets

(56) References Cited

U.S. PATENT DOCUMENTS

| | | | |
|---|---|---|---|
| 8,631,466 B2 | 1/2014 | Cha et al. | |
| 8,649,809 B2 | 2/2014 | Röbke et al. | |
| 9,521,683 B2 * | 12/2016 | Van Phan | H04W 72/042 |
| 2002/0111144 A1 | 8/2002 | Schiff | |
| 2004/0202295 A1 | 10/2004 | Shen et al. | |
| 2004/0209634 A1 | 10/2004 | Hrastar | |
| 2005/0026597 A1 | 2/2005 | Kim et al. | |
| 2005/0111383 A1 | 5/2005 | Grob et al. | |
| 2005/0239451 A1 | 10/2005 | Periyalwar et al. | |
| 2006/0075263 A1 | 4/2006 | Taylor | |
| 2006/0190470 A1 | 8/2006 | Lemnotis | |
| 2007/0040813 A1 | 2/2007 | Kushler | |
| 2007/0129076 A1 | 6/2007 | Cho et al. | |
| 2008/0002658 A1 | 1/2008 | Soliman | |
| 2008/0069063 A1 | 3/2008 | Li et al. | |
| 2009/0075630 A1 | 3/2009 | Mclean | |
| 2009/0119776 A1 | 5/2009 | Palnitkar et al. | |
| 2009/0130984 A1 | 5/2009 | Lee et al. | |
| 2010/0009675 A1 | 1/2010 | Wijting et al. | |
| 2010/0095123 A1 | 4/2010 | He | |
| 2010/0240312 A1 | 9/2010 | Pend et al. | |
| 2010/0279672 A1 | 11/2010 | Koskela et al. | |
| 2011/0081908 A1 | 4/2011 | Michaelis et al. | |
| 2011/0143771 A1 | 6/2011 | Edge et al. | |
| 2011/0145421 A1 | 6/2011 | Yao et al. | |
| 2011/0147462 A1 | 6/2011 | Speich | |
| 2011/0159799 A1 | 6/2011 | Chen et al. | |
| 2011/0194530 A1 | 8/2011 | Tinnakornsrisuphap et al. | |
| 2011/0216739 A1 * | 9/2011 | Lee | H04W 36/00 370/331 |
| 2011/0258313 A1 * | 10/2011 | Mallik | H04W 8/005 709/224 |
| 2011/0268004 A1 | 11/2011 | Doppler et al. | |
| 2011/0275382 A1 | 11/2011 | Hakola et al. | |
| 2011/0294474 A1 | 12/2011 | Barany et al. | |
| 2011/0317569 A1 | 12/2011 | Kneckt et al. | |
| 2012/0026971 A1 | 2/2012 | Khandelia et al. | |
| 2012/0044865 A1 | 2/2012 | Singh | |
| 2012/0051315 A1 | 3/2012 | Wang et al. | |
| 2012/0093070 A1 | 4/2012 | Huang | |
| 2012/0163235 A1 * | 6/2012 | Ho | H04W 76/023 370/254 |
| 2012/0163252 A1 | 6/2012 | Ahn et al. | |
| 2012/0179789 A1 | 7/2012 | Griot et al. | |
| 2012/0240216 A1 | 9/2012 | Gutierrez | |
| 2013/0003629 A1 | 1/2013 | Jeong et al. | |
| 2013/0028235 A1 | 1/2013 | Barrett et al. | |
| 2013/0038537 A1 | 2/2013 | Nishii | |
| 2013/0046544 A1 | 2/2013 | Kay | |
| 2013/0159522 A1 | 6/2013 | Hakola et al. | |
| 2013/0160101 A1 | 6/2013 | Hakola et al. | |
| 2013/0315196 A1 | 11/2013 | Lim et al. | |
| 2013/0329689 A1 | 12/2013 | Choi et al. | |
| 2014/0004796 A1 | 1/2014 | Cakulev et al. | |
| 2014/0010175 A1 | 1/2014 | Chiu | |
| 2014/0022986 A1 | 1/2014 | Wu | |
| 2014/0078952 A1 | 3/2014 | Bontu et al. | |
| 2014/0086152 A1 | 3/2014 | Bontu et al. | |
| 2014/0086153 A1 | 3/2014 | Bontu et al. | |
| 2014/0086157 A1 | 3/2014 | Bontu et al. | |
| 2014/0106707 A1 | 4/2014 | Bontu et al. | |
| 2014/0115522 A1 | 4/2014 | Kataoka | |
| 2014/0122607 A1 | 5/2014 | Fodor et al. | |
| 2014/0140296 A1 | 5/2014 | Choi et al. | |
| 2014/0153390 A1 | 6/2014 | Ishii et al. | |
| 2014/0342738 A1 * | 11/2014 | Ishii | H04W 28/08 455/436 |
| 2015/0036495 A1 | 2/2015 | Venkatachalam | |
| 2015/0131475 A1 | 5/2015 | Van Phan | |

FOREIGN PATENT DOCUMENTS

| | | | |
|---|---|---|---|
| EP | 1063785 | 12/2000 | |
| EP | 2665299 A2 * | 11/2013 | |
| EP | EP 2665299 A2 * | 11/2013 | H04W 8/005 |
| JP | 2001044932 | 2/2001 | |
| KR | 20120074251 | 7/2012 | |
| WO | 2000/27045 | 5/2000 | |
| WO | 2009/138820 | 11/2009 | |
| WO | 2010/007498 | 1/2010 | |
| WO | 2010/059856 | 5/2010 | |
| WO | 2011/036507 | 3/2011 | |
| WO | 2011050519 | 5/2011 | |
| WO | 2011147462 A1 | 12/2011 | |
| WO | 2012/052911 | 4/2012 | |
| WO | 2012060934 | 5/2012 | |
| WO | 2012/088470 | 6/2012 | |

OTHER PUBLICATIONS

Gabor Fodor et al.: "Design Aspects of Network Assisted Device-to-Device Communications," IEEE Communications Magazine, IEEE Service Center, Piscataway, US, vol. 50, No. 3, Mar. 1, 2012, pp. 170-177, 8 pages.

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).

3GPP TS 36.211 V10.3.0 (Sep. 2011) Technical Specification: Evolved Universal Terrestrial Radio Access (E-UTRA); Physical Channels and Modulation (Release 10).

3GPP TS 36.212 V10.1.0 (Mar. 2011) Technical Specification: Evolved Universal Terrestrial Radio Access (E-UTRA); Multiplexing and channel coding (Release 10).

3GPP TS 36.213 V10.1.0 (Mar. 2011) Technical Specification: Evolved Universal Terrestrial Radio Access (E-UTRA); Physical layer procedures (Release 10).

3GPP TS 36.331 V10.1.0 (Mar. 2011) Technical Specification: Evolved Universal Terrestrial Radio Access (E-UTRA); Radio Resource Control (RRC); Protocol specification (Release 10).

Taiwanese Office Action and Search Report in Taiwanese Application No. 102132478, dated Jan. 22, 2015, 11 pages.

Office Action issued in U.S. Appl. No. 13/652,011 dated Jan. 23, 2015.

Office Action and Search Report issued in Taiwanese Application No. 102132482 dated Dec. 26, 2014; 9 pages.

Office Action and Search Report issued in Taiwanese Application No. 102132487 dated Dec. 26, 2014; 12 pages.

Office Action and Search Report issued in TW Application No. 102132483 dated Dec. 25, 2014; 8 pages.

3GPP Standard; 3GPP TS 36.331,V11.1.0; 3rd Generation Partnership Project; Technical Specification Group Radio Access Network; Evolved Universal Terrestrial Radio Access (E-UTRA); Radio Resource Control (RRC); Protocol specification (Release 11); Sep. 2012; 325 pages.

"Lei Lei et al: ""Operator controlled device-to-device communications in LTE-advanced networks""", IEEE Wireless Communications, IEEE Service Center, Piscataway, NJ, US, vol. 19, No. 3, Jun. 2012; 9 pages".

Intel: "Pro se Use Case for Unidirectional D2D Communication", A 3GPP Draft; S1-120065; 3GPP TSG-SA WG1, Meeting #57; Kyoto, Japan; Feb. 2012; 3 pages.

Office Action issued in U.S. Appl. No. 13/621,703 dated Nov. 19, 2014.

Office Action issued in U.S. Appl. No. 13/624,736 dated Aug. 27, 2014; 14 pages.

International Search Report for Application No. PCT/US2013/026157, dated Jul. 30, 2013, 24 pages.

International Search Report for Application No. PCT/US2013/026372, dated Apr. 24, 2013, 3 pages.

International Search Report for Application No. PCT/US2013/026104, dated Jun. 24, 2013, 3 pages.

International Search Report for Application No. PCT/US2013/026356, dated Jun. 19, 2013, 3 pages.

International Search Report for Application No. PCT/US2013/026382, dated Jul. 11, 2013, 5 pages.

(56) References Cited

OTHER PUBLICATIONS

Search Report issued in TW Application No. 102132479 dated Nov. 7, 2014, 1 page.
International Preliminary Report on Patentability in International Application No. PCT/US2013/026174, dated Apr. 2, 2015, 13 pages.
United States Office Action in U.S. Appl. No. 13/627,647, dated Mar. 13, 2015, 38 pages.
International Preliminary Report on Patentability in International Application No. PCT/US2013/026157, dated Apr. 2, 2015, 18 pages.
International Preliminary Report on Patentability in International Application No. PCT/US2013/026382, dated Apr. 2, 2015, 18 pages.
International Preliminary Report on Patentability in International Application No. PCT/US2013/026372, dated Mar. 31, 2015, 9 pages.
International Preliminary Report on Patentability in International Application No. PCT/US2013/026356, dated Apr. 30, 2013, 9 pages.
Office Action issued in related Chinese Application No. 201380060975.7 dated May 5, 2016.
Office Action issued in related Korean Application No. 10-2015-7012597 dated Mar. 18, 2016.
Office Action issued in related Korean Application No. 10-2015-7010012 dated Apr. 19, 2016.
Communication Pursuant to Article 94(3) EPC issued in related European Application No. 13707754.1 dated Apr. 11; 2016.
Office Action issued in Korean Application No. 10-2015-7010443 dated May 27, 2016.
Notice of Allowance issued in Korean Application No. 10-2015-7010010 dated Jun. 27, 2016.
Office Action issued in Korean Application No. 10-2015-7010443 dated Nov. 25, 2016.
Office Action issued in Chinese Application No. 201380060975.7 dated Dec. 5, 2016.
Communication Pursuant to Article 94(3) EPC issued in European Application No. 13707748.3 dated Feb. 8, 2017.
Office Action issued in Chinese Application No. 201380060975.7 dated May 4, 2017.
Office Action issued in Korean Application No. 10-2015-7010012 dated Sep. 6, 2016.
Communication Pursuant to Article 94(3) EPC issued in European Application No. 13707748.3 dated Oct. 18, 2016.

\* cited by examiner

DEVICE HANDSHAKE/DISCOVERY FOR INTER-DEVICE COMMUNICATION IN WIRELESS COMMUNICATION SYSTEMS

TECHNICAL FIELD

The present disclosure generally relates to communications in wireless communication systems, and more particularly, to device handshake/discovery procedure for inter-device communications in wireless communication systems.

BACKGROUND

In wireless networks such as Long Term Evolution (LTE) and LTE-Advanced communication networks, a user equipment (UE) may communicate with other UEs via a base station and an evolved packet core (EPC) network. For example, a UE may send data packets to its serving base station on an uplink. The serving base station may forward the data packets to the EPC network and the EPC network may forward the data packet to another base station or to the same base station that is serving another UE. Data transfer between the UEs is routed through the base station and the EPC. The communication between the UEs is controlled by the policies set by the operator administering the network.

The UEs may communicate directly with each other using other radio access technology (RAT), such as, wireless local area network (WLAN) or Bluetooth when the UEs are located in close proximity and have access to the other RAT. However, this requires the availability of the other RAT and the capability of the UEs to operate in the other RAT. Moreover, handover from cellular technology to other RATs may result in service interruption and dropped calls.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

The present disclosure is directed to systems, methods, and apparatuses for inter-device communication in cellular wireless communication systems. In the current cellular communication system, data transfer between UEs has to be routed through a base station and a core network. When UEs located in close proximity communicate with each other, it would be advantageous for the UEs to communicate via a direct inter-device communication link between them, instead of transferring the data via a network. By providing a direct inter-device communication link between the UEs, improved overall spectral efficiency may be achieved. Moreover, the direct link between the UEs requires lower transmit power at the UE compared to transmitting to the base station, thereby resulting in battery savings at the UEs. Additionally, communicating over the direct link between the UEs may improve quality of service (QoS).

Although the UE may be able to communicate over a direct communication link using other RAT, such as, WLAN, Bluetooth, etc., it requires availability of the services of the other RAT and also requires implementation of other RAT at the UE. Furthermore, service interruptions and dropped calls may result from switching or handover between different RATs. Therefore, it may be advantageous to enable communications over the inter-device communication link using the same cellular radio access technology and operating in the same radio band.

Reference will now be made in detail to example approaches implemented according to the disclosure; the examples are illustrated in the accompanying drawings. Wherever possible, the same reference numbers will be used throughout the drawings to refer to the same or like parts.

Figure 1:
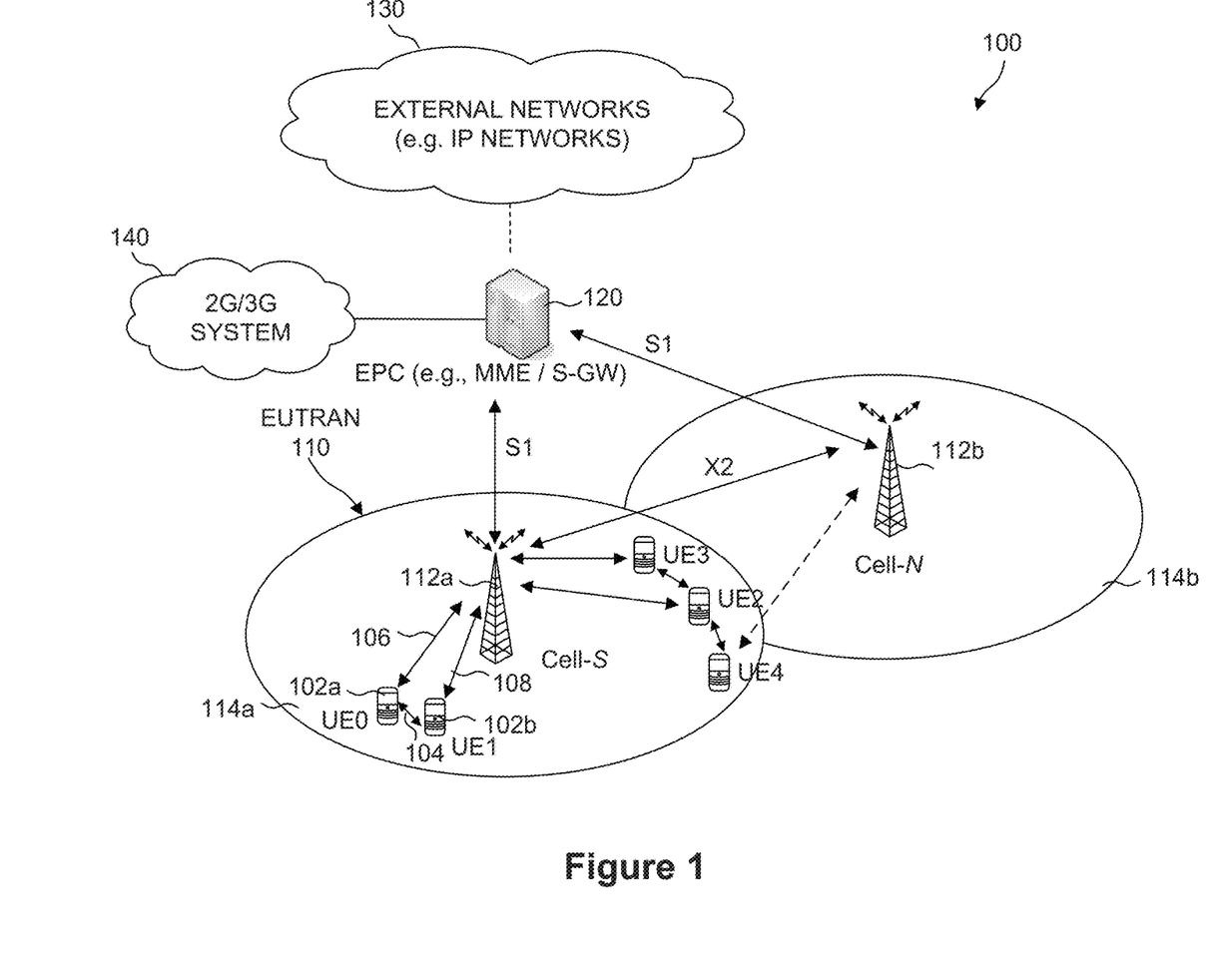
FIG. 1 illustrates an example cellular wireless communication system in which methods and systems consistent with the present disclosure may be implemented.

FIG. 1 illustrates an example cellular wireless communication system 100 in which systems and methods consistent with this disclosure may be implemented. The cellular network system 100 shown in FIG. 1 includes one or more base stations (i.e., 112a and 112b). In the LTE example of FIG. 1, the base stations are shown as evolved Node Bs (eNBs) 112a and 112b, although base stations operate in any wireless communications system, including for example, macro cell, femto cell, relay cell, and pico cell. Base stations are nodes that can relay signals for mobile devices, also referred to herein a user equipment, or other base stations. The base stations are also referred to as access node devices. The example LTE telecommunications environment 100 of FIG. 1 includes one or more radio access networks 110, core networks (CNs) 120, and external networks 130. In certain implementations, the radio access networks may be Evolved Universal Terrestrial Radio Access Networks (EUTRANs). In addition, core networks 120 may be evolved packet cores (EPCs). Further, as shown, one or more mobile electronic devices 102a, 102b operate within the LTE system 100. In some implementations, 2G/3G systems 140, e.g., Global System for Mobile communication (GSM), Interim Standard 95 (IS-95), Universal Mobile Telecommunications System (UMTS) and Code Division Multiple Access (CDMA2000) may also be integrated into the LTE telecommunication system 100.

In the example LTE system shown in FIG. 1, the EUTRAN 110 includes eNB 112a and eNB 112b. Cell 114a is the service area of eNB 112a and Cell 114b is the service area of eNB 112b. User equipment (UEs) 102a and 102b operate in Cell 114a and are served by eNB 112a. The EUTRAN 110 can include one or more eNBs (e.g., eNB 112a and eNB 112b) and one or more UEs (e.g., UE 102a and UE 102b) can operate in a cell. The eNBs 112a and 112b communicate directly to the UEs 102a and 102b. In some implementations, the eNB 112a or 112b may be in a one-to-many relationship with the UEs 102a and 102b, e.g., eNB 112a in the example LTE system 100 can serve multiple UEs (i.e., UE 102a and UE 102b) within its coverage area Cell 114a, but each of UE 102a and UE 102b may be connected to one serving eNB 112a at a time. In some implementations, the eNBs 112a and 112b may be in a many-to-many relationship with the UEs, e.g., UE 102a and UE 102b can be connected to eNB 112a and eNB 112b. The eNB 112a may be connected to eNB 112b such that handover may be conducted if one or both of the UEs 102a and 102b travels, e.g., from cell 114a to cell 114b. The UEs 102a and 102b may be any wireless electronic device used by an end-user to communicate, for example, within the LTE system 100.

The UEs 102a and 102b may transmit voice, video, multimedia, text, web content and/or any other user/client-specific content. The transmission of some content, e.g., video and web content, may require high channel throughput to satisfy the end-user demand. In some instances, however, the channel between UEs 102a, 102b and eNBs 112a, 112b may be contaminated by multipath fading due to the multiple signal paths arising from many reflections in the wireless environment. Accordingly, the UEs' transmission may adapt to the wireless environment. In short, the UEs 102a and 102b may generate requests, send responses or otherwise communicate in different means with Evolved Packet Core (EPC) 120 and/or Internet Protocol (IP) networks 130 through one or more eNBs 112a and 112b.

In some implementations consistent with the present disclosure, the UEs 102a and 102b may communicate over an inter-device communication link when they are located in close proximity to one another, without routing the data through the eNB 112a. The boundary of the distance of the inter-device communication link may be limited by the transmission power of the UEs. In one example, close proximity could be a few meters. In another example, close proximity could be tens of meters. It is also possible that in certain circumstances, the close proximity may mean larger distance such as hundreds of meters. For example, the UEs 102a and 102b may communicate directly over the inter-device communication link 104, instead of communicating with each other through their links with the eNB 112a, i.e., 106 and 108 respectively. The inter-device communication link may also be referred to as a device-to-device (D2D) communication link. The UEs 102a and 102b may simultaneously maintain an active communication link with the eNB 112a such that the UEs 102a and 102b may still receive messages from the eNB or other UEs, when communicating with each other over the direct inter-device link.

Examples of UEs include, but are not limited to, a mobile phone, a smart phone, a telephone, a television, a remote controller, a set-top box, a computer monitor, a computer (including a tablet computer such as a BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. The UE 102a or 102b may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 102a or 102b may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

A radio access network is part of a mobile telecommunication system which implements a radio access technology, such as Universal Mobile Telecommunications System (UMTS), CDMA2000 and 3rd Generation Partnership Project (3GPP) LTE. In many applications, the Radio Access Network (RAN) included in an LTE telecommunications system 100 is called an EUTRAN 110. The EUTRAN 110 can be located between the UEs 102a, 102b and EPC 120. The EUTRAN 110 includes at least one eNB 112a or 112b. The eNB can be a radio base station that may control all, or at least some, radio related functions in a fixed part of the system. One or more of eNB 112a or 112b can provide radio interface within their coverage area or a cell for the UEs 102a, 102b to communicate. The eNBs 112a and 112b may be distributed throughout the cellular network to provide a wide area of coverage. The eNBs 112a and 112b may directly communicate with one or more UEs 102a, 102b, other eNBs, and the EPC 120.

The eNBs 112a and 112b may be the end point of the radio protocols towards the UEs 102a, 102b and may relay signals between the radio connection and the connectivity towards the EPC 120. The communication interface between the eNB and the EPC is often referred to as an S1 interface. In certain implementations, EPC 120 is a central component of a core network (CN). The CN can be a backbone network, which may be a central part of the telecommunications system. The EPC 120 can include a mobility management entity (MME), a serving gateway (SGW), and a packet data network gateway (PGW). The MME may be the main control element in the EPC 120 responsible for the functionalities comprising the control plane functions related to subscriber and session management. The SGW can serve as a local mobility anchor, such that the packets are routed through this point for intra EUTRAN 110 mobility and mobility with other legacy 2G/3G systems 140. The SGW functions may include the user plane tunnel management and switching. The PGW may provide connectivity to the services domain comprising external networks 130, such as the IP networks. The UEs 102a, 102b, EUTRAN 110, and EPC 120 are sometimes referred to as the evolved packet system (EPS). It is to be understood that the architectural evolvement of the LTE system 100 is focused on the EPS. The functional evolution may include both EPS and external networks 130.

Though described in terms of FIG. 1, the present disclosure is not limited to such an environment. In general, cellular telecommunication systems may be described as cellular networks made up of a number of radio cells, or cells that are each served by a base station or other fixed transceiver. The cells are used to cover different locations in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication systems include IEEE 802.11 WLAN, IEEE 802.16 WiMAX network, etc.

Figure 2:
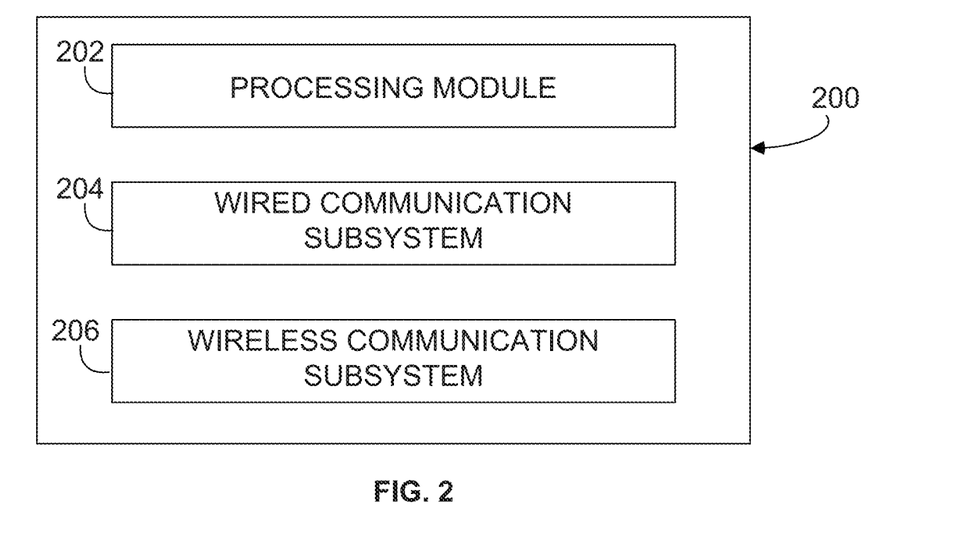
FIG. 2 illustrates an example access node device, in accordance with an embodiment of the present disclosure.

FIG. 2 illustrates an example access node device 200 consistent with certain aspects of this disclosure. The access node device 200 includes a processing module 202, a wired communication subsystem 204, and a wireless communication subsystem 206. The processing module 202 can include one or more processing components (alternatively referred to as "processors" or "central processing units" (CPUs)) operable to execute instructions associated with managing IDC interference. The processing module 202 can also include other auxiliary components, such as random access memory (RAM), read only memory (ROM), secondary storage (for example, a hard disk drive or flash memory).

Additionally, the processing module 202 can execute certain instructions and commands to provide wireless or wired communication, using the wired communication subsystem 204 or a wireless communication subsystem 206. One skilled in the art will readily appreciate that various other components can also be included in the example access node device 200.

Figure 3:
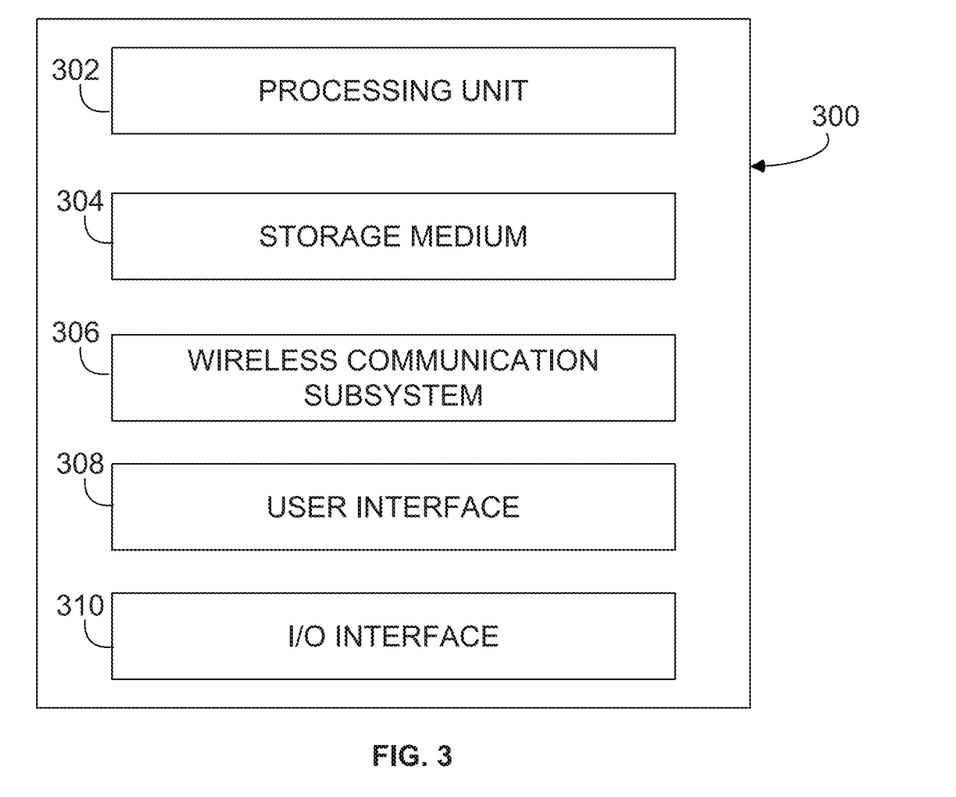
FIG. 3 illustrates an example user equipment device, in accordance with an embodiment of the present disclosure.

FIG. 3 illustrates an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 may include components and perform functionality similar to the processing module 202 described with regard to FIG. 2. The wireless communication subsystem 306 may be configured to provide wireless communications for data information or control information provided by the processing unit 302. The wireless communication subsystem 306 can include, for example, one or more antennas, a receiver, a transmitter, a local oscillator, a mixer, and a digital signal processing (DSP) unit. In some implementations, the wireless communication subsystem 306 may receive or transmit information over a direct inter-device communication link. In some implementations, the wireless communication subsystem 306 can support MIMO transmissions.

The user interface 308 can include, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 310 can include, for example, a universal serial bus (USB) interface. One skilled in the art will readily appreciate that various other components can also be included in the example UE device 300.

For UEs to communicate over a direct inter-device communication link, an inter-device communication link is enabled between the UEs. The direct inter-device communication link allows data exchange between the UEs, without routing through the base station and the core network. Descriptions will now be made about methods for initiating the inter-device communication link in the cellular wireless communication system, according to certain embodiments of the present disclosure.

Figure 4:
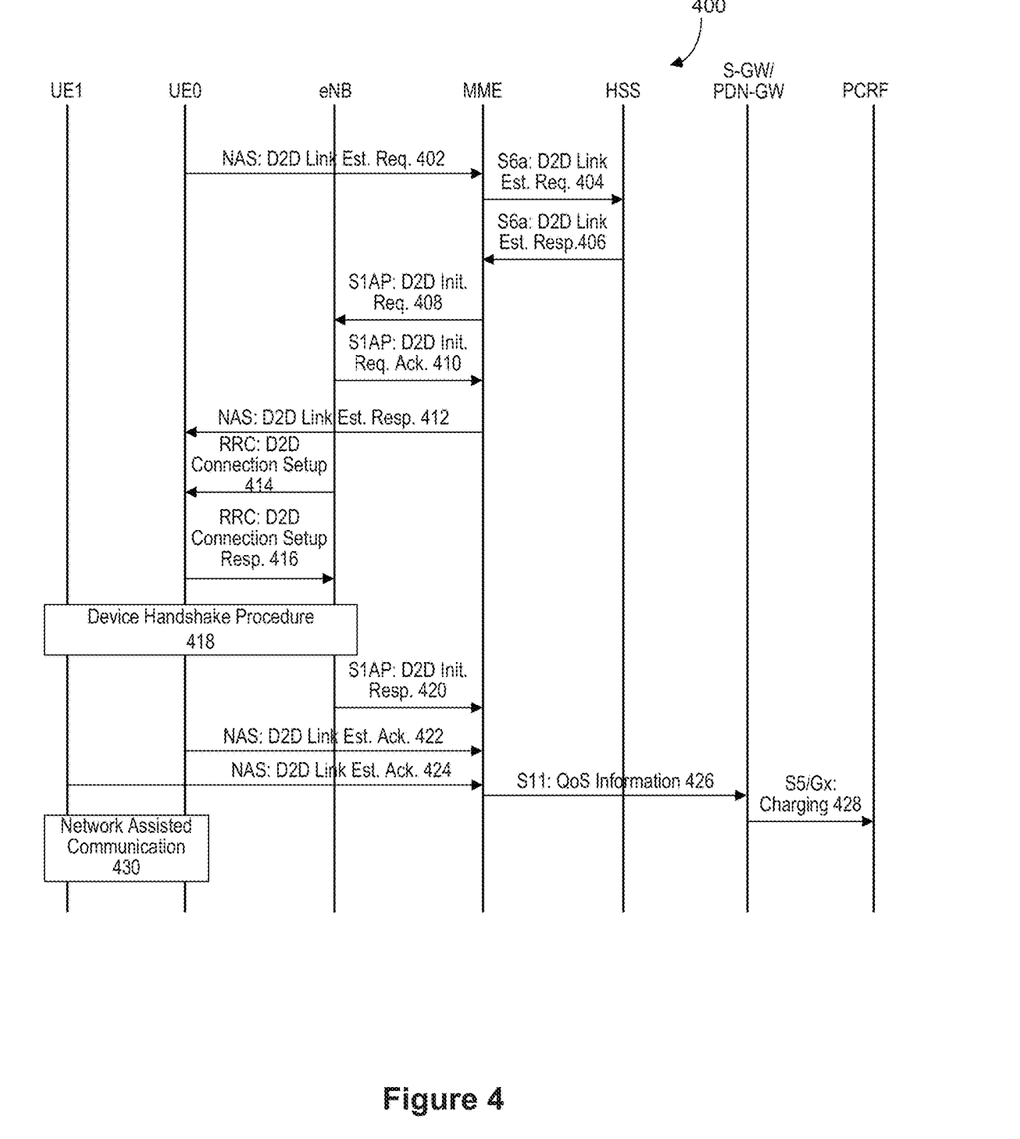
FIG. 4 illustrates a flow diagram of an example method for initiating an inter-device communication link consistent with the present disclosure.

FIG. 4 illustrates a flow diagram 400 of an example method for initiating an inter-device communication link consistent with the present disclosure. As shown in FIG. 4, the establishment of the inter-device communication link may be initiated by a UE. In the illustrated example method, UE0 desires a direct communication link with UE1, which may be located near UE0. UE0 can request the network to setup a direct communication link with a proximate device, for example, to allow users located close by to share data, to play an interactive game, etc. Thus, UE0 sends a non-access stratum (NAS) message to an MME to initiate a direct device-to-device (D2D) link with UE1 at 402. As an example, the NAS message to initiate the D2D link with other UEs may be called a D2D Link Establishment Request message.

The D2D Link Establishment Request message may include specific information for the direct communication link, for example, bandwidth requirements, data rate information, quality of service (QoS) information, time duration, etc., for the direct inter-device communication link. The NAS message may also include information of the other UE involved in the direct inter-device communication link. For example, the NAS message may include the UE identification (ID) information of the other UE, i.e., UE1, in the illustrated example. UE0 may obtain UE1's identity by, for example, scanning an ID bar code, which includes UE1's phone number or other identities. UE0 may also obtain UE1's identity by other alternatives, such as email, text, Near Field Communication (NFC), and so on. UE0 and UE1 may also form a group, and information regarding UEs in the group may be stored at the UEs. Hence when UE0 and UE1 are in close proximity to one another, the ID information of UE0 and UE1 can be obtained to initiate the inter-device communication. The group may include more than 2 users. For example, an interactive group may consist of 10 or more users. The number of users in the group may be pre-determined by the network. The upper limit on the group size could be pre-set, for example, in the standards or by the operators. The group member information can be updated when there is a change to the group membership, such as the addition or deletion of a group member, or a change in the information associated with one or more members. The group and/or information regarding the group may be maintained on the application layer. For example, the application layer could form a new group according to the user's request, change the settings of the groups, delete a group, update the membership inside one group, etc. In another example, some predefined groups could be formed for certain users.

After receiving the NAS message from UE0, the MME may forward the UE request to the home subscriber server (HSS) in a D2D Link Establishment Request message at 404. The communication interface between the MME and the HSS may be referred to as an S6a interface. The MME may also include information about the UE in the D2D Link Establishment Request message sent to the HSS at 404.

After receiving the message from the MME, the HSS may check the QoS requirements requested by the UE for the inter-device communication link and send a D2D Link Establishment Response message to the MME at 406. If the HSS responds negatively to the MME, the MME may send a NAS D2D Link Establishment Response message to UE0 with a negative acknowledgment, indicating an unsuccessful establishment of the inter-device communication link. In the NAS message, the MME may also indicate the cause for the rejection. Consequently, UE0 may re-initiate the inter-device communication link based on the cause.

On the other hand, if the HSS responds positively to the MME at 406, indicating an acceptance of the UE0's request for a direct communication link with UE1, the MME may subsequently send a D2D Initialization Request message to UE0's serving eNB at 408 for enabling the direct communication link between UE0 and UE1. The communication interface between the MME and the eNB is referred to as an S1 interface. The MME may include the QoS requirements of the direct communication link between UE0 and UE1 in the D2D Initialization Request message. The eNB may check the QoS requirements of the requested inter-device link and available radio resources at the eNB. The eNB may then determine whether the direct communication link between UE0 and UE1 can be enabled based on the QoS requirements and the available radio resources. Correspondingly, the eNB may send a D2D Initialization Request Acknowledgement message to the MME via the S1 application protocol (AP) at 410, including a positive or negative acknowledgement. The eNB may include reasons for rejecting the D2D initialization request in the D2D Initialization Request Acknowledgement message when a negative acknowledgement is sent to the MME.

If the MME receives a positive acknowledgement from the eNB at 410, the MME may send a D2D Link Establishment Response message with a positive acknowledgment to UE0 at 412, indicating an acceptance of the request from UE0 to initiate a direct communication link with UE1. The MME may include any changes in the QoS policies in the D2D Link Establishment Response message. If the MME receives a negative acknowledgement from the eNB at 410, the MME may send a D2D Link Establishment Response message with a negative acknowledgment to UE0 at 412, indicating a rejection of the request from UE0 to initiate a direct communication link with UE1.

When the eNB determines that the direct communication link between UE0 and UE1 may be enabled, the eNB sends a radio resource control (RRC) message D2D Connection Setup to UE0 at 414. The eNB may use the Cell radio network temporary identity (C-RNTI) of UE0 to send this RRC message to UE0 at 414. The D2D Connection Setup message may include transmission parameters for the direct communication link, such as a C-RNTI of UE1, temporary transmit point identifications for each UE communicating over the inter-device communication link, minimum and maximum transmit power levels for transmitting over the inter-device communication link, a device-to-device radio network temporary identity (DD-RNTI) for identifying the direct inter-device link, a transmit power step for the direct inter-device link, a guard time for the direct inter-device link, etc.

Subsequent to receiving the D2D Connection Setup message from the eNB, UE0 may send a D2D Connection Setup Response message to the eNB at 416, indicating a successful reception of the D2D Connection Setup message. In another example, the eNB may also send an RRC message D2D Connection Setup to UE1 which includes the similar information such as DD-RNTI. Subsequent to receiving the D2D Connection Setup message from the eNB, UE1 may also send a D2D Connection Setup Response message to the eNB, indicating a successful reception of the D2D Connection Setup message. After receiving the D2D Connection Setup Response message from both UE0 and UE1, the eNB may initiate a device handshake procedure with UE0 and UE1 at 418. During this procedure, the UEs identify each other and initiate link parameter tuning such that a reliable communication link can be established between the UEs.

On the other hand, if the eNB does not receive the D2D Connection Setup Response message from UE0 or UE1 over a predetermined time period, the eNB may resend the D2D Connection Setup message to UE0 or UE1. After resending the D2D Connection Setup for a predetermined number of times, the eNB may abandon the direct link setup procedure for the link between UE0 and UE1 and send a D2D Initialization Response message to the MME, indicating a failure to contact UE0 or UE1. The predetermined number could be pre-set, e.g., by the operators. A prohibit timer could also be used to regulate the transmission of the D2D Connection Setup messages. Basically, after the eNB sends out the D2D Connection Setup message, the eNB cannot send another D2D Connection Setup message until the prohibit timer is expired.

Upon successful completion of the device handshake procedure, the eNB may send a D2D Initialization Response message to the MME at 420, indicating a completion of the device handshake procedure. UE0 and UE1 may also send a D2D Link Establishment Acknowledgement message to the MME at 422 and 424, respectively, indicating a successful completion of the device handshake procedure. Consequently, the MME may communicate the QoS requirements of the direct inter-device link to the serving gateway (S-GW) at 426. The serving gateway may then forward this QoS information to the policy and charging rules function (PCRF) for charging the UEs at 428. In some implementations, the MME may communicate the QoS requirements of the direct inter-device link to the PCRF via the S-GW at an earlier time, for example, subsequent to receiving the positive acknowledgment from the eNB at 410.

Upon successful completion of the device handshake procedure, the eNB may also determine and communicate the specifics of resources to be used for the inter-device link to UE0 and UE1. The network assisted inter-device communication between UE0 and UE1 may then be conducted over the direct inter-device communication link at 430. LTE downlink or uplink radio resources may be used for the inter-device communications between the UEs. Because of the close proximity between the UEs, the signal to interference plus noise ratio (SINR) of the inter-device communication link may be higher than the SINRs of links between the UEs and their respective serving base stations, resulting in better communication quality and more efficient radio resource usage on the inter-device communication link.

In certain instances, the resources assigned by the eNB may be time limited and this time limitation may be set based on the requested application or the UE's request for specific bandwidth for the direct inter-device link. The UE may modify this time limit by, for example, sending another request or a NAS update request to the MME for extension. The MME may send a NAS update response message to the UE subsequently. The UE may send the NAS update request message to the MME for modification of the time duration of the inter-device communications, modification to the quality of service, addition of one or more other UEs to the inter-device communication link, deletion of one or more UEs from the inter-device communication link, or other updates related to the inter-device communication link.

If the UE wishes to terminate the inter-device communication at an earlier time before the time limit, the UE may send a message to the MME and subsequently the MME can instruct the eNB to stop the radio resource assignment to the UE for the inter-device communication. After receiving the message from the MME, the base station may terminate the inter-device communication link between the UEs. After the inter-device link is terminated, MME/SGW may send a report to the PCRF, reporting the amount of data transmitted on the direct inter-device link, the actual duration of the communication over the direct inter-device link, etc.

As described above, in the initiation of the inter-device communication link, device handshake/discovery procedures are part of the initiation process. The device discovery procedure is initiated to check whether the devices can listen to each other's transmissions. The device handshake procedure is to set up the link parameters of direct inter-device communication link to allow the devices to reliably communicate over the direct link. While a successful device handshake procedure usually indicates that the UEs are ready to communicate over the direct link, a completion of the device discovery procedure may not be an indication of an immediate establishment of the inter-device communication link. Nevertheless, the detailed process of the device handshake procedure and the device discovery procedure are largely similar. Thus, it is to be understood that the methods and process described below for the device handshake procedure can also be applied to the device discovery procedure.

Figure 5:
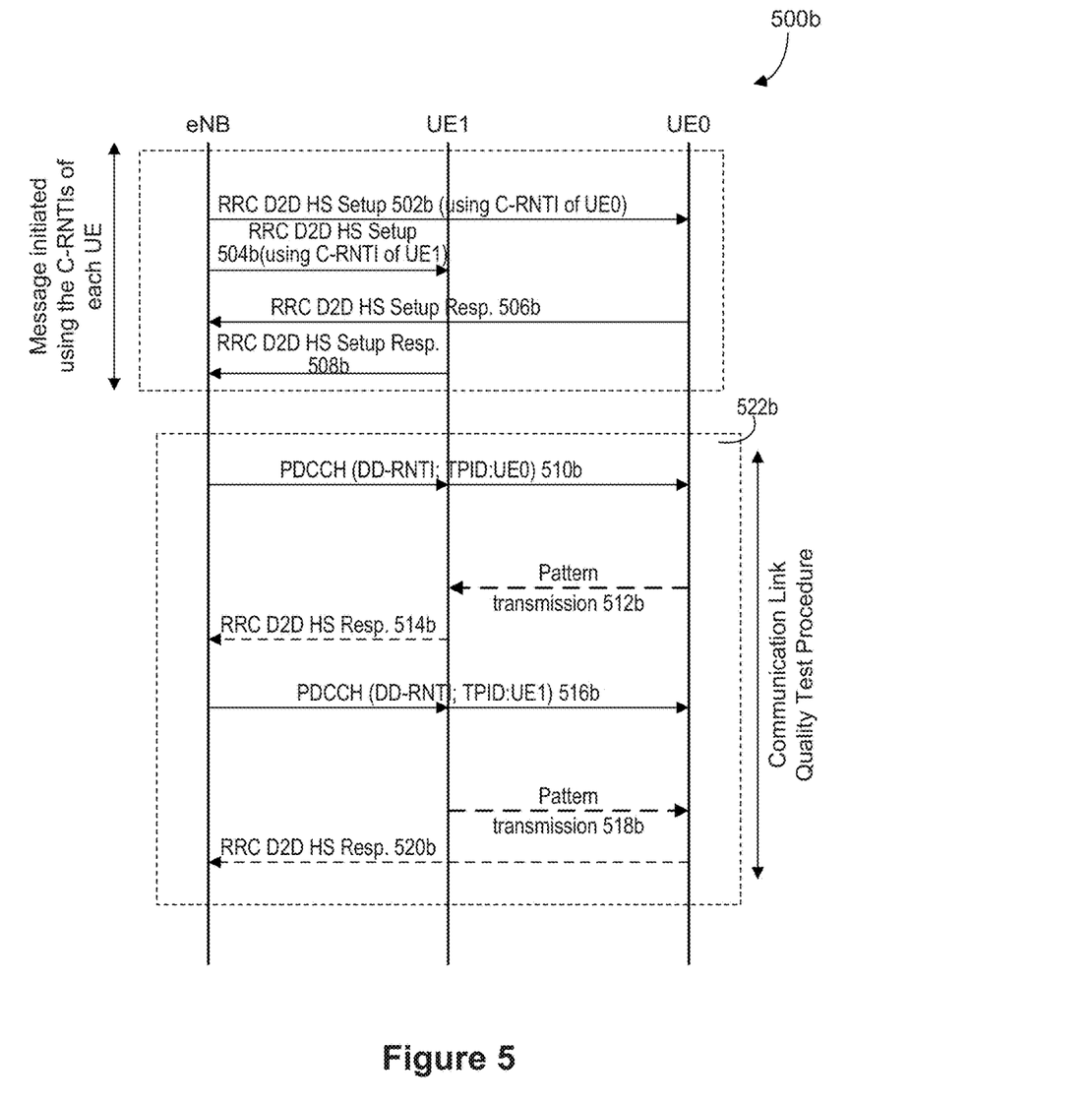
FIG. 5 illustrates a flow diagram of an example device handshake procedure, in accordance with an embodiment of the present disclosure.

FIG. 5 illustrates a flow diagram 500b of an example device handshake procedure, in accordance with an embodiment of the present disclosure. As shown in FIG. 5, the eNB may send an RRC D2D Handshake (HS) Setup message to UE0 and UE1 at 502b and 504b, respectively, to set up a device handshake procedure. Subsequently, UE0 and UE1 may send respective RRC D2D Handshake Setup Response messages to the eNB at 506b and 508b, confirming a reception of the RRC D2D Handshake Setup Message. UE0 and UE1 may then start monitoring the messages from the eNB for an initiation of the device handshake procedure. The radio resources for sending these RRC messages are assigned/granted by the serving eNB via PDCCH using the UE's C-RNTIs.

The RRC D2D Handshake (HS) Setup message may contain transmission/reception parameters associated with a device handshake. Device handshake transmission/reception parameters may include: the transmission patterns, transmit point IDs, DD-RNTI etc. The transmission patterns may be indicated by an index of a transmission pattern. For example, a set of transmission patterns may be defined, such as in a standards document, with corresponding indices. Alternatively specific parameters which may be used to generate the sequence may be indicated. This message may also include an indication whether the uplink (UL) radio resources or downlink (DL) radio resources are assigned for handshake procedure. Furthermore, this message may also include a feedback descriptor for the UEs to include specific parameters in the D2D handshake (HS) Response message. For example, the feedback descriptor may include signal quality or received signal strength indicator measured over the received transmission pattern from the other device. This message may also indicate the number of transmissions of transmission patterns from each device and/or the periodicity of these transmissions. The receiving UE may wait to receive all the transmitted patterns and average the received quality/strength over all the receptions and include that measure as specified in the feedback descriptor in the D2D HS Response message.

Next, a quality test procedure 522b may be performed by one or more of UE0, UE1, and the eNB over the direct communication link. The quality test procedure can be considered as a part of the device handshake procedure. The quality test procedure may include a number of message exchanges between UE1 and UE0 over the direct communication link between UE1 and UE0. Various synchronization functions between the UEs may be established during the quality test procedure.

As an initiation of the device handshake procedure and the quality test procedure, the eNB may send an initiation message to UE0 and UE1 at 510b. The initiation message may include dedicated downlink (DL) or uplink (UL) resources to UE1 or UE0 such that UE1 and UE0 may use the assigned DL or UL resources for an initial handshake. The initiation message may use a downlink control information (DCI) format which includes an indicator indicating that a transmission pattern is to be transmitted over the inter-device communication link. The transmission may be a predetermined transmission pattern or a transmission pattern configured by the eNB, The indicator may be a one-bit indicator or multi-bit indicator. The initiation message may have an implicit or explicit indication about whether the radio resource grant is for UL or DL resources. The initiation message may also use a DCI format which includes a field indicatinag at least one transmission mode or reception mode over the inter-device communication link. The initiation message may include a resource grant and the initiation message may be a layer 1 message transmitted over a physical downlink control channel (PDCCH). As an example, the initiation message may be a PDCCH message using a DD-RNTI. The initiation message may include a cyclic redundancy check (CRC) of the PDCCH which may be scrambled by the DD-RNTI. In some implementations, only the UEs aware of the initiation of the inter-device communication perform decoding of the PDCCH with the DD-RNTI. A UE which is not actively taking part in the inter-device communication need not attempt to decode the PDCCH using a DD-RNTI. In another alternative, the initiation message may be a PDCCH message using the existing DCI formats. However, additional fields may be added to the existing DCI format. For example, the eNB may send a PDCCH message to UE0. The PDCCH message includes at least the resource grant information and MCS information. Additional field is added to indicate that this PDCCH message is for D2D communication which could be a flag indicator. In one example, this flag indicator could be one bit. Another additional field may be added to indicate whether the UE0 is transmitting on the allocated resource using the signaled MCS or is receiving on the allocated resource using the signaled MCS. Some other additional fields may also be added to the existing DCI formats for other D2D communication parameters such as power control information. The quality test procedure may be initiated by the eNB multiple times before sending the S1AP: D2D Init Resp 420 to the MME.

The initiation message may also include a temporary ID of the transmit point (TP). The transmit point means the UE that is allowed to transmit on the inter-device communication link. A temporary transmit point ID is assigned to each UE participating in the direct link communication during the initiation of the inter-device communication link. For example, the temporary transmit point IDs for UEs participating in the direct link communication may be included in the D2D Connection Setup message sent from the eNB to the UE prior to the device handshake procedure. Alternatively, the temporary transmit point IDs for UEs participating in the direct link communication may be included in the D2D HS Setup message sent from the eNB to the UE prior to the device handshake procedure. In the initiation message for the device handshake procedure, the eNB may include a temporary TP ID of the UE which is to transmit over the direct inter-device communication link. As shown, for example, a temporary TP ID of UE0 is included in the PDCCH message 510b, indicating that UE0 is the UE transmitting over the direct link with the allocated resources in the PDCCH message. Correspondingly, UE1 is the UE listening/receiving over the direct link on the allocated resources in the PDCCH message.

The format of the PDCCH message 510b may be similar to the PDCCH message defined in LTE or LTE-Advanced. Additionally or alternatively, a field may be added to, or modified within, the downlink control information (DCI) format to indicate the temporary ID of a transmit point. For example, the PDCCH message 510b may indicate the transmit point ID of UE0 in the DCI format such that UE0 will transmit over the inter-device communication link after receiving the PDCCH message. In some implementations, an additional field may be added to the DCI format, indicating that this DCI format is for an inter-device communication and may also indicate whether the corresponding UE is transmitting or receiving. For example, when UE0 detects a DCI format with this additional field which indicates "transmitting", UE0 may transmit the data using the allocated resources at a subframe which is N subframes later than the PDCCH message. N may be predetermined to be 4 or other number. Likewise, when UE0 detects a DCI format with the additional field which indicates "receiving", UE0 may receive the data in the allocated resources N subframes later.

After receiving the initiation message for a device handshake procedure, UE0 may transmit a predetermined pattern at 512b, as UE0 is identified to be the transmit point in the initiation message 510b. LTE downlink or uplink resources may be used for the transmission of the predetermined pattern. The predetermined pattern may have good correlation properties such that UE1 may be able to tune its timing and carrier frequency based on the predetermined pattern. The predetermined pattern may be transmitted after a predetermined time period subsequent to the reception of the initiation message, for example, 4 subframes after the reception of the initiation message. The predetermined patterns may be included in the D2D Connection Setup message sent from the eNB to the UE(s) prior to the device handshake procedure.

If UE1 successfully decodes the transmission 512b from UE0, UE1 may send an RRC D2D HS Response message to the eNB at 514b, indicating the successful detection. The resources for the RRC D2D HS Response message may be granted by the eNB in advance. For example, the resource grant for the RRC D2D HS Response message may be included in the initial PDCCH grant 510b for the inter-device communication. In some implementations, UE1 may also report an inferior channel quality indicator (CQI), a rank indicator (RI), or one or more parameters reflecting the channel condition, in the HS Response message. The eNB may request modification to the D2D transmission responsive to receiving the report from the UE1. For example, the eNB may request the transmitting UE, i.e., UE0, to adjust its transmit power in the subsequent transmissions.

Similar to 510b, the eNB may send a PDCCH message to UE0 and UE1 to indicate that the transmit point ID is UE1 at 516b. After receiving the PDCCH message from the eNB, UE1 may transmit the predetermined pattern to UE0 over the inter-device communication link at 518b. If UE0 successfully decodes the transmission 518b from UE1, UE0 may send an RRC D2D HS Response message to the eNB at 520b, indicating the detection success. The resources for the RRC D2D HS Response message may be granted by the eNB in advance. For example, the resource grant for the RRC D2D HS Response message may be included in the PDCCH grant 516b for the inter-device communication. In some implementations, UE0 may also report an inferior CQI, an RI, or one or more parameters reflecting the channel condition, in the HS Response message. The eNB may request modification to the D2D transmission responsive to receiving the report from the UE0. For example, the eNB may request the transmitting UE, i.e., UE1, to adjust its transmit power in future transmissions.

In the above described device handshake/discovery procedure, the DD-RNTI may be used to identify the inter-device communication. The UEs may recognize that the resource grants are dedicated for inter-device communication when the resource grants are decoded using the DD-RNTI.

Table 1 below includes an example of DD-RNTI values. As shown, a set of RNTI values may be reserved for the DD-RNTI. The DD-RNTI may be set to have predetermined hexadecimal values ranging from 0001 to FFF3. Note that the DD-RNTI values shown here are only for illustration purpose. The DD-RNTI values could be other values.

TABLE 1

DD-RNTI Values

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI, DD-RNTI |
| 003D-FFF3 | C-RNTI, Semi-Persistent Scheduling C-RNTI, Temporary C-RNTI, TPC-PUCCH-RNTI and TPC-PUSCH-RNTI, DD-RNTI |
| FFF4-FFFC | Reserved for future use |
| FFFD | M-RNTI |
| FFFE | P-RNTI |
| FFFF | SI-RNTI |

When a UE is involved in an inter-device communication, a DD-RNTI may be allocated to the UE for this inter-device communication. Different inter-device communications may have the same or different DD-RNTIs. In an extreme case, all inter-device communications may share the same DD-RNTI and an additional field in the DCI format may identify a transmitting party or a receiving party of the particular inter-device communication. In some implementations, each inter-device communication may have a different DD-RNTI. The eNB needs to notify the UEs involved in the inter-device communication of the specific DD-RNTI when setting up the inter-device communication for the UEs. In some other implementations, DCI formats can be used for the PDCCH messages for the inter-device communication link. Medium access control (MAC) control element may be used for the resource allocation of the inter-device communication link and may be transmitted in a physical downlink shared channel (PDSCH).

In some implementations, when more than two UEs are involved in the inter-device communications, for any resource grant from the serving cell, only one UE will be transmitting while all other UEs are listening. The UEs that intend to transmit may request the resource from the eNB via the scheduling request (SR), buffer status report (BSR), or the random access channel. A special layer 1 channel may be designed for this purpose or the current SR channel could be modified. In one alternative, a SR channel shared by multiple users may be designed in order to reduce the signaling overhead. The eNB may then determine which UE is granted resources to transmit during a particular subframe or subframes. The UEs that do not receive resources may request the resource again at a later time.

In some scenarios, two UEs are located close enough to establish a direct link between them, although each UE belonging to a different serving eNB. This may occur when the two UEs are located in the cell edge of the respective serving cells. To establish a direct inter-device communication link between them, the serving eNB may initiate a handover procedure and move both UEs to the same serving eNB. In some implementations, a group of C-RNTIs may be reserved at both serving cells for the inter-device communication. The same DD-RNTI may be assigned to the UEs by their respective serving eNBs/cells. The PDCCH message for the resource allocation of the inter-device link may be transmitted by a single serving eNB. During the direct inter-device communication, both UEs may listen to the same eNB for resource allocation for the inter-device communication link and maintain a communication link with their respective serving cells simultaneously.

The systems and methods described above may be implemented by any hardware, software or a combination of hardware and software having the above described functions. The software code, either in its entirety or a part thereof, may be stored in a computer readable memory.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented. Method steps may be implemented in an order that differs from that presented herein.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method for wireless communication, comprising:
    receiving, at a first user equipment (UE), an inter-device connection setup message from a base station, wherein the inter-device connection setup message is received using a cell radio network temporary identity (C-RNTI) of the first UE and includes a device-to-device radio network temporary identity (DD-RNTI) identifying an inter-device communication link between the first UE and a second UE, and the DD-RNTI is different than the C-RNTI of the first UE;
    receiving, at the first UE, an initiation message from the base station for initiating a device-to-device handshake procedure between the first UE and the second UE, wherein the initiation message allocates a resource for a transmission from the second UE to the first UE with a predetermined transmission pattern, the initiation message includes an indicator that explicitly indicates whether the allocated resource is an uplink (UL) radio resource or a downlink (DL) radio resource, the first UE receives the initiation message using the DD-RNTI, the second UE receives a second initiation message from the base station, the second initiation message indicates the resource for the transmission from the second UE to the first UE, and the second UE receives the second initiation message using the DD-RNTI;
    receiving the transmission with the predetermined transmission pattern from the second UE over the inter-device communication link;
    determining a signal quality of received signal associated with the transmission from the second UE to the first UE; and
    sending a response message to the base station associated with the device-to-device handshake procedure, wherein the response message includes the determined signal quality and instructs the base station to send a message to the second UE to adjust a transmitting power of the transmission from the second UE to the first UE based on the determined signal quality.

2. The method of claim 1, wherein the initiation message from the base station is received using a downlink control information (DCI) format which includes a field indicating that the initiation message is for the inter-device communication link.

3. The method of claim 1, wherein the initiation message from the base station includes a transmit point identification associated with the second UE.

4. The method of claim 1, wherein the inter-device connection setup message is a radio resource control (RRC) inter-device connection setup message, and the method further comprising:
    sending a RRC inter-device connection setup response message to the base station.

5. The method of claim 4, wherein the RRC inter-device connection setup message includes at least one of:
    a set of predetermined transmit patterns;
    a feedback descriptor;
    or
    a guard time.

6. The method of claim 1, wherein the response message indicates a completion of the device-to-device handshake procedure.

7. The method of claim 1, wherein the transmission with the predetermined pattern is received over the inter-device communication link using long term evolution (LTE) downlink resources.

8. The method of claim 1, wherein the transmission with the predetermined transmission pattern is received over the inter-device communication link using long term evolution (LTE) uplink resources.

9. The method of claim 1, wherein the initiation message from the base station is received using a downlink control information (DCI) format which includes an indicator indicating that the predetermined transmission pattern is to be transmitted over the inter-device communication link.

10. The method of claim 1, wherein the initiation message from the base station is received using a downlink control information (DCI) format which includes a field indicating at least one transmission mode or reception mode over the inter-device communication link.

11. A method at a base station, comprising:
    transmitting an inter-device connection setup message to a first user equipment (UE), wherein the inter-device connection setup message is transmitted using a cell radio network temporary identity (C-RNTI) of the first UE and includes a device-to-device radio network temporary identity (DD-RNTI) identifying an inter-device communication link between the first UE and a second UE, and the DD-RNTI is different than the C-RNTI of the first UE;
    transmitting an initiation message to the first UE for initiating a device-to-device handshake procedure between the first UE and the second UE, wherein the initiation message allocates a resource for a transmission from the second UE to the first UE with a predetermined transmission pattern, the initiation message includes an indicator that explicitly indicates whether the allocated resource is an uplink (UL) radio resource or a downlink (DL) radio resource, and the initiation message is transmitted using the DD-RNTI;

transmitting a second initiation message to the second UE, the second initiation message indicates the resource for the transmission from the second UE to the first UE, and the second initiation message is transmitted using the DD-RNTI; and receiving a response message from the first UE associated with the device-to-device handshake procedure, wherein the response message includes a signal quality of received signal at the first UE associated with the transmission from the second UE to the first UE;

in response to receiving the response message, sending a message to the second UE to adjust a transmitting power of the transmission from the second UE to the first UE based on the received signal quality.

12. The method of claim 11, wherein the initiation message includes the predetermined transmission pattern for the second UE to transmit over the inter-device communication link.

13. The method of claim 11, wherein the resource allocation allocates long term evolution (LTE) downlink resources.

14. The method of claim 11, wherein the resource allocation allocates long term evolution (LTE) uplink resources.

15. The method of claim 11, wherein the initiation message includes a transmit point identification of the second UE.

16. The method of claim 11, wherein the initiation message sent from the base station uses a downlink control information (DCI) format which includes an indication that the initiation message is for the inter-device communication link.

17. The method of claim 11, wherein the inter-device connection setup message is a radio resource control (RRC) inter-device connection setup message, and the method further comprising:

receiving a RRC inter-device connection setup response message from the first UE.

18. The method of claim 11, wherein the response message indicates a completion of the device-to-device handshake procedure.

19. The method of claim 11, wherein the initiation message sent from the base station uses a downlink control information (DCI) format which includes an indication that a predetermined transmission pattern is to be transmitted over the inter-device communication link.

20. The method of claim 11, wherein the initiation message from the base station is transmitted using a downlink control information (DCI) format which includes a field indicating at least one transmission mode or reception mode over the inter-device communication link.

* * * * *